United States Patent [19]

Al-Thani

[11] Patent Number: 6,086,017
[45] Date of Patent: Jul. 11, 2000

[54] APPARATUS FOR CAUSING AN AIRCRAFT WHEEL TO ROTATE

[76] Inventor: Hamad Ali Jassim Al-Thani, Box 5001, Doha, Qatar

[21] Appl. No.: 09/068,580

[22] PCT Filed: Nov. 14, 1996

[86] PCT No.: PCT/GB96/02791

§ 371 Date: Jul. 7, 1998

§ 102(e) Date: Jul. 7, 1998

[87] PCT Pub. No.: WO97/18127

PCT Pub. Date: May 22, 1997

[30] Foreign Application Priority Data

Nov. 15, 1995 [GB] United Kingdom .................. 9523446

[51] Int. Cl.$^7$ ........................................ B64C 25/32
[52] U.S. Cl. ........................................ 244/103 S
[58] Field of Search .................. 244/103 S, 103 R, 244/100 R

[56] References Cited

U.S. PATENT DOCUMENTS

| | | |
|---|---|---|
| 2,386,301 | 10/1945 | Duke et al. . |
| 2,412,406 | 12/1946 | Kerezi . |
| 2,414,849 | 1/1947 | Beazley . |
| 2,435,459 | 2/1948 | Oden ........................ 244/103 S |
| 2,666,604 | 1/1954 | Davis . |
| 3,026,069 | 3/1962 | Young et al. ............... 244/103 S |
| 3,741,503 | 6/1973 | Cabeza . |
| 3,866,860 | 2/1975 | Opitz, Sr. ................. 244/103 S |
| 4,385,739 | 5/1983 | Soderberg . |
| 4,732,350 | 3/1988 | Lamont . |
| 5,213,285 | 5/1993 | Stanko . |
| 5,251,848 | 10/1993 | Gannatal . |
| 5,417,387 | 5/1995 | Jennings . |

FOREIGN PATENT DOCUMENTS

| | | |
|---|---|---|
| 912 891 | 8/1946 | France . |
| 003241908 | 5/1984 | Germany . |
| 003420507 | 12/1985 | Germany . |
| 003504675 | 4/1986 | Germany . |
| 0 584 638 | 1/1947 | United Kingdom . |
| 0 588 959 | 6/1947 | United Kingdom . |
| 0 603804 | 6/1948 | United Kingdom . |
| 2256402 | 12/1992 | United Kingdom . |

OTHER PUBLICATIONS

UK Search Report.
WO97/18127 (PCT/GB96/02791) International Search Report Feb. 5, 1997.

*Primary Examiner*—Peter M. Poon
*Assistant Examiner*—Charles R Ducker, Jr.
*Attorney, Agent, or Firm*—Blank Rome Comisky & McCauley LLP

[57] ABSTRACT

An apparatus for causing an aircraft wheel to rotate in an airflow includes wind-catching members disposed around a central axis. The wind-catching members are moved between a non-operative, retracted position and an operative-extended position in which the wind-catching members project outside the outer radial periphery of the aircraft wheel. Alternatively, at least one nozzle or vent is provided, centered on the axle of the wheel and arranged to expel air at least partially circumferentially, along with an air supply for providing air to the at least one nozzle or vent. The air supply includes a compressed air source and an air supply passage connecting the compressed air source to the at least one nozzle or vent. Each nozzle or vent is rotatable with the wheel so that the expulsion of air causes rotation of the wheel.

29 Claims, 16 Drawing Sheets

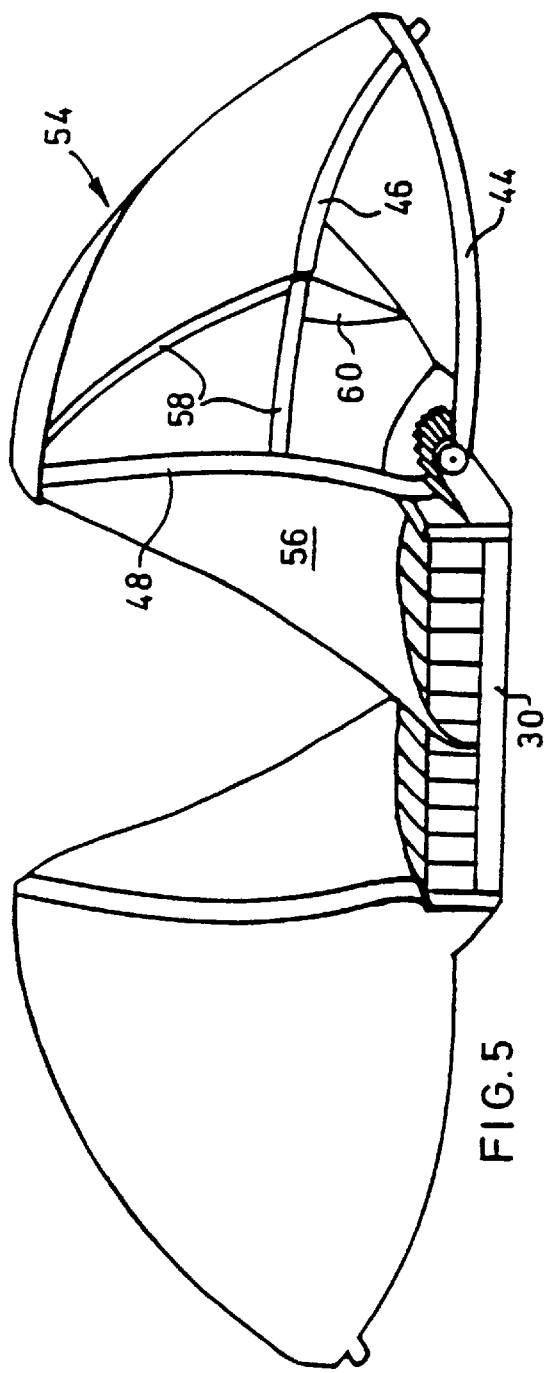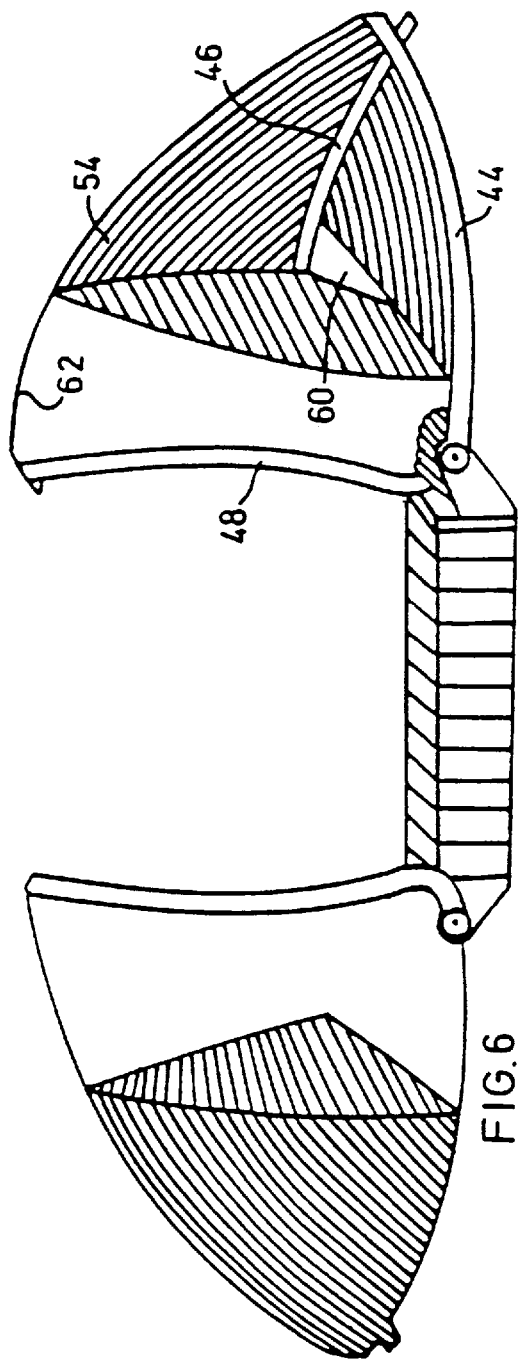

APPARATUS FOR CAUSING AN AIRCRAFT WHEEL TO ROTATE

FIELD OF THE INVENTION

The invention relates to apparatus for causing an aircraft wheel to rotate.

DESCRIPTION OF RELATED ART

It is well known that aircraft tires need to be replaced at frequent intervals as a result of wear sustained on landing. It is also recognized that this wear can be reduced by causing the wheels of an aircraft to rotate, immediately prior to landing, at or near the landing speed of the aircraft. Many attempts to achieve such wheel rotation have been proposed but one of the major difficulties has been devising a wheel or attachment which produces sufficient turning moment during landing but which does not create problematic drag during take-off.

One way to increase the turning moment during landing without increasing the drag during take-off is to provide rotating means which are movable between a deployed position and a retracted position. In the deployed position, used during landing, the rotating means are positioned so as to maximize the turning moment applied to the wheel. Increased drag is not problematic during landing; indeed, it can be beneficial. In the retracted position, used during take-off, drag is minimized along with the turning moment which is not required on take-off.

Examples of prior art arrangements which utilize this type of retractable system are illustrated in U.S. Pat. Nos. 2,666,604 and 4,732,350. However, because of the need to retract the scoops and vanes, it will be noted that the total area of the scoops and vanes exposed to the airflow is relatively small. It will also be noted that the vanes and scoops of the prior art are positioned relatively close to the aircraft wheel in their extended positions.

Further examples of prior art, namely U.S. Pat. No. 4,385,739 and U.S. Pat. No. 2,414,849, illustrate methods of causing an aircraft wheel to rotate by directing a flow of air, taken either from a compressed air source or from an engine, onto vanes located on the wheel. However, the presence of the nozzle which directs the flow of air onto the vanes is cumbersome and increases the drag on take-off.

SUMMARY OF THE INVENTION

It is an object of the present invention to provide an aircraft wheel or attachment therefor in which it is possible to expose a relatively large area of vanes, scoops or other wind-catching members to the airflow.

It is another object of the invention to provide an aircraft wheel or attachment therefor which has rotation means which are extendible away from the axle of the wheel to a relatively great extent to maximize the turning moment applied to the wheel.

It is still another object of the invention to provide an arrangement of nozzles or the like which does not itself create significant drag upon take-off.

To achieve the above and other objects, the present invention is directed to an apparatus for causing an aircraft wheel to rotate in an airflow which includes wind-catching members disposed around a central axis. The wind-catching members are moved between a non-operative, retracted position and an operative-extended position in which the wind-catching members project outside the outer radial periphery of the aircraft wheel.

The present invention is further directed to an apparatus in which at least one nozzle or vent is provided, centered on the axle of the wheel and arranged to expel air at least partially circumferentially, along with an air supply for providing air to the at least one nozzle or vent. The air supply includes a compressed air source and an air supply passage connecting the compressed air source to the at least one nozzle or vent. Each nozzle or vent is rotatable with the wheel so that the expulsion of air causes rotation of the wheel.

BRIEF DESCRIPTION OF THE DRAWINGS

Embodiments of the invention will now be described with reference to the accompanying drawings wherein:

FIGS. 5 and 6 illustrate alternative means for accommodating the wheel of FIGS. 1 to 4 in an undercarriage bay;

DETAILED DESCRIPTION OF THE PREFERRED EMBODIMENTS

Figure 1:
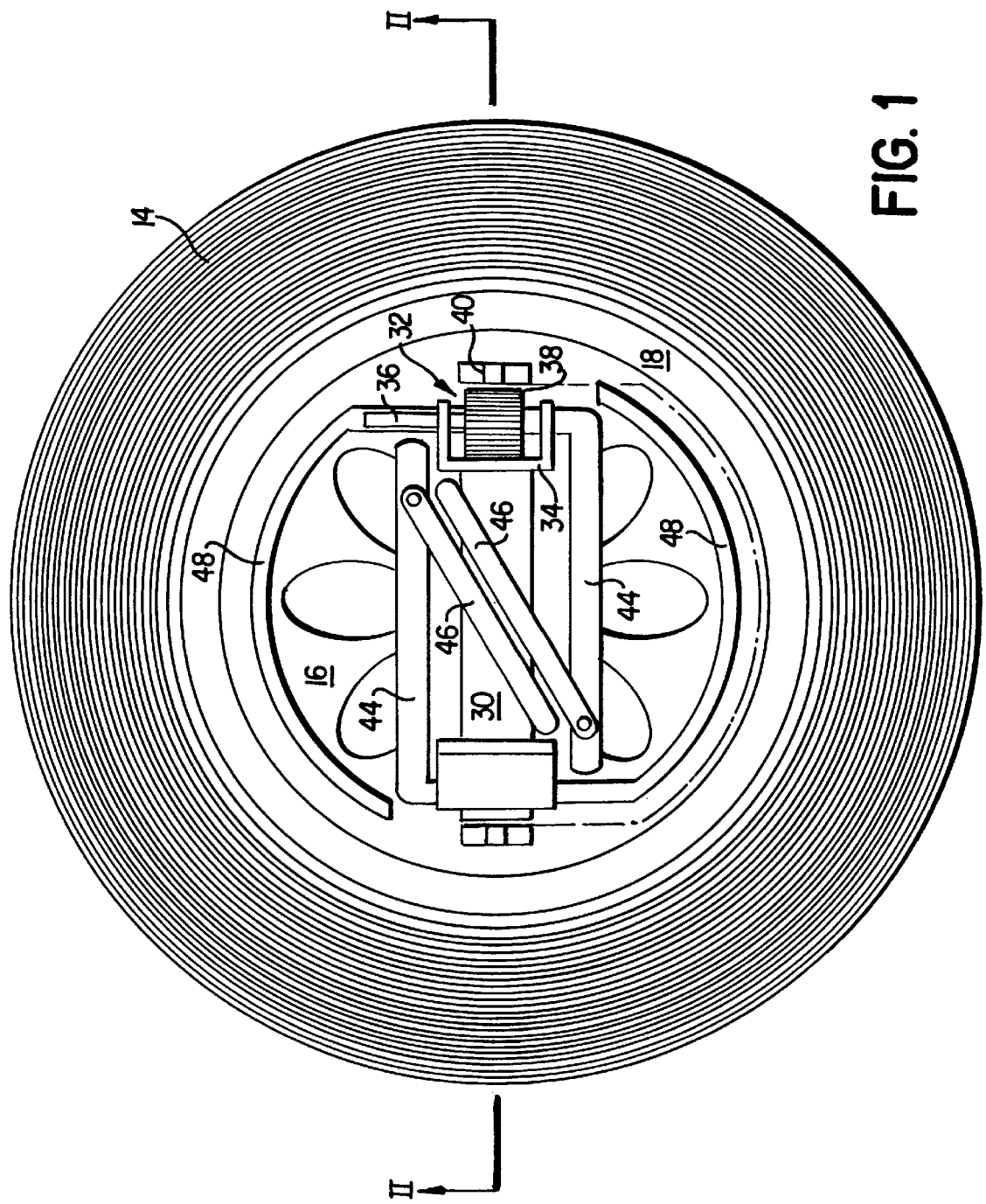
FIG. 1 is a plan view of a wheel incorporating apparatus (excluding sails) embodying a first aspect of the invention shown in a fully-retracted position.

FIGS. 1 to 8 illustrate apparatus 10 according to a first aspect of the invention in combination with a wheel 12 and pneumatic tire 14. The wheel 12 consists essentially of a wheel hub 16 and a wheel rim 18 on which the pneumatic tire 14 is mounted. The hub 16 is mounted on an axle 20 by means of bearings 22 in the normal manner.

Mounted inside the axle 20 is a piston and cylinder arrangement 24. The piston and cylinder arrangement 24 is powered by means of an existing compressed air source or other pneumatic or hydraulic system already located in the aircraft. Convenient systems which could be utilized are those used to operate the engine compressor, the de-icing system or the hydraulic braking system. Since the system will only be required to operate the apparatus of the present invention for a very short time during the landing approach, there should be no interference with the normal operation of any appropriate system. An appropriate connection 26 is provided to enable connection with an appropriate hydraulic or pneumatic source.

The piston and cylinder arrangement 24 is utilized to cause telescopic extension and retraction of the remainder of the apparatus 10 in the longitudinal direction of the axle 20. A telescopically extending rod 28 is designed to support the remainder of the apparatus 10. The remainder of the apparatus 10 essentially comprises a central support member 30 extending substantially diametrically across the wheel hub 16. At either end of the support member 30 are pivotable connections 32, each of which consists essentially of a U-shaped housing 34 supporting an elongate pivot 36 between its arms. Mounted on the elongate pivot 36 between the arms of each U-shaped housing 34 is a toothed wheel 38. The toothed wheel 38 is arranged to engage either with a vertically extending spur rack 40 which extends from the wheel rim 18 in the direction of the axle 20, or with an additional rack 42 located on an inclined surface of the wheel rim 18.

Fixedly attached to a first end of the elongate pivot 36, is an outer arm 44. Hingedly attached to the distal end of the outer arm 44 remote from the elongate pivot 36 is a bracing arm 46. Rotatably attached to the other end of the elongate pivot 36 is an upper arm 48. The connection between the upper arm 48 and the elongate pivot 36 is by way of gearing or a screw thread such that rotation of the elongate pivot 36 through a predetermined angle results in rotation of the upper arm 48 through substantially half of that predetermined angle. Alternatively, a slip and lock connection can be provided between the elongate pivot 36 and the upper arm 48.

The mounting of the pivotable connections 32 on the support member 30 are such that a small amount of displacement therebetween is allowable. Effectively, both U-shaped housings 34 can be displaced radially with respect to the wheel 12 towards the axle 20 so as to allow the toothed wheels 38 to become disengaged from the spur racks 40. The purpose of this feature will be described later. Means (not shown) for preventing the unintentional pivoting of the U-shaped housing 34 may be provided and are releasable by means of release buttons 50 operated by contact with the lower surface of the support member 30. Also, latches 52 may be provided on the support member 30 or on any other convenient part of the wheel 12 for holding the various arms 44, 46, 48 in their retracted positions.

The operation of the apparatus 10 will now be described with reference to FIGS. 2, 3 and 4. The sail members normally attached to the arms have been omitted from these Figures for the purposes of clarity.

Figure 2:
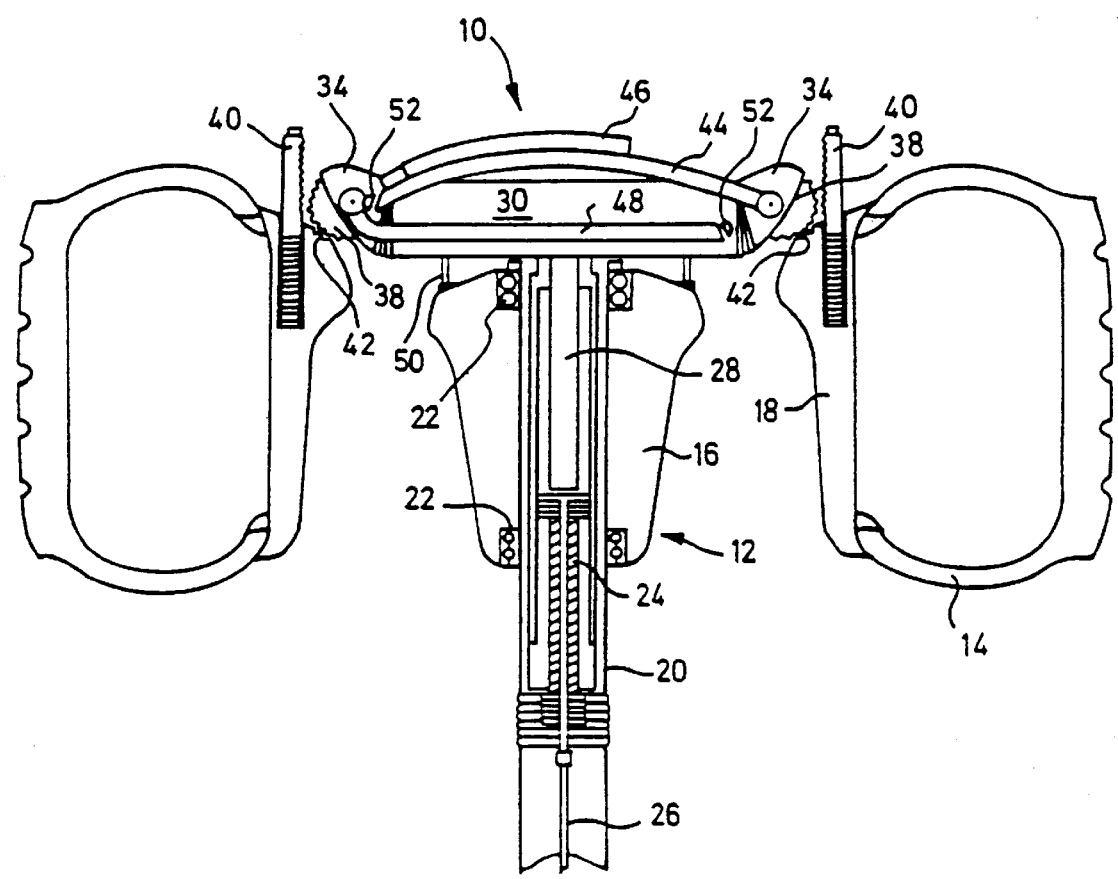
FIG. 2 is a cross-sectional view taken along the line II—II of FIG. 1.
Figure 3:
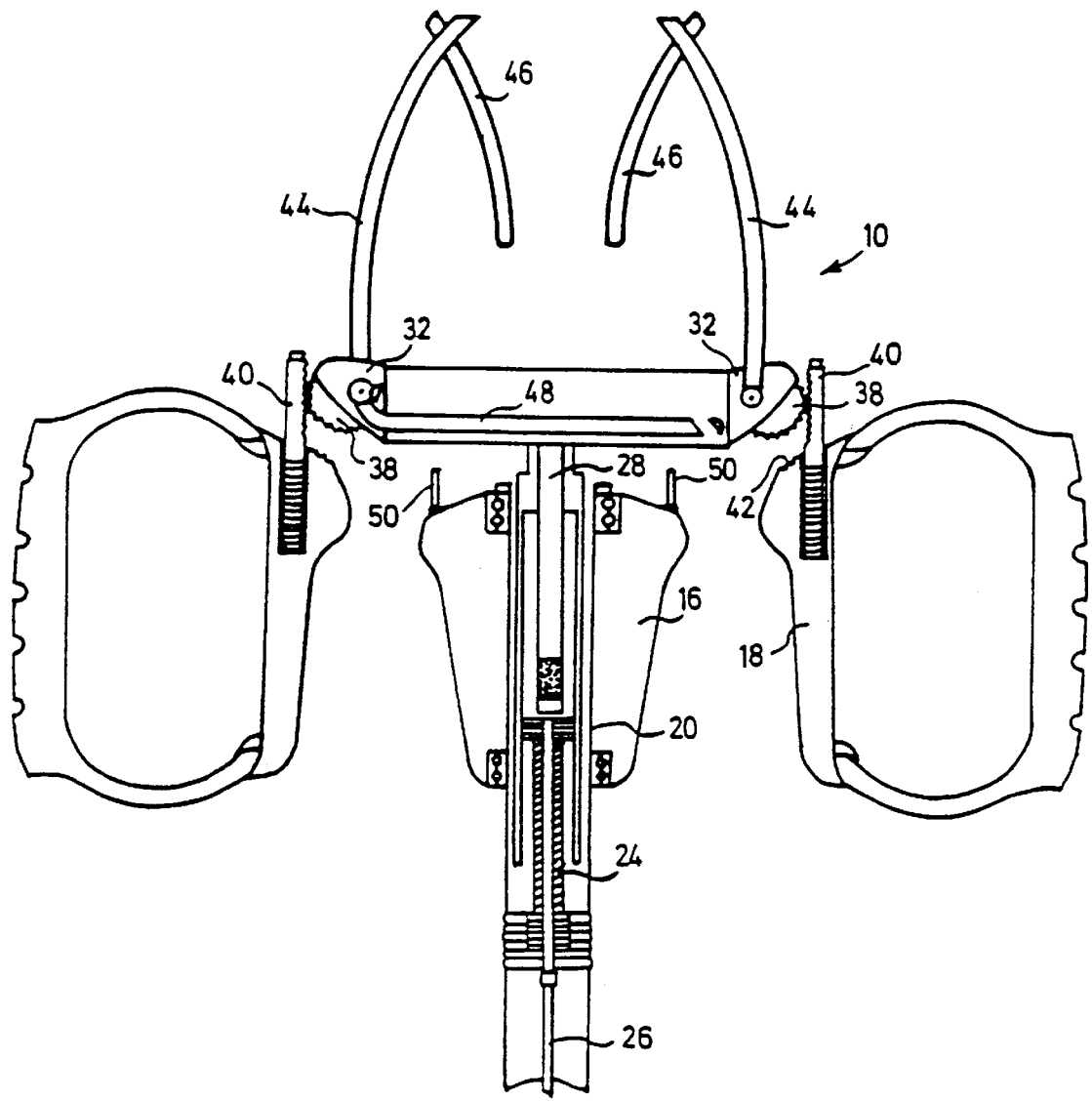
FIG. 3 is a view similar to FIG. 2 but showing the apparatus in a semi-extended position.

FIG. 2 illustrates the apparatus 10 in its fully retracted position. The telescopic rod 28 is retracted within the axle 20 under the action of the piston and cylinder arrangement 24. The support member 30 is retracted as far as possible towards the wheel 12, thereby maintaining contact with the release buttons 50. This allows the U-shaped housing 34 to be rotated with respect to the support member 30 so that the toothed wheels 38 are in interengaging contact with the additional racks 42 and out of contact with the spur racks 40. The toothed wheels 38 are therefore rotated as far as possible in a direction which maintains the various arms 44, 46, 48 firmly pressed towards the support members 30. The latches 52 maintain the various arms 44, 46, 48 in this retracted position.

When the apparatus 10 is to be deployed, compressed air or other hydraulic or pneumatic fluid is introduced into the piston and cylinder arrangement 24 via the connection 26. The operation of the piston and cylinder arrangement 24 causes the telescopic rod 28 to extend in the longitudinal direction of the axle 20, thereby moving the entire apparatus 10 in the same direction. The movement of the support member 30 out of contact with the release buttons 50 locks the pivotable connections 32 into the positions illustrated in FIG. 3. This locking coincides with the movement of the toothed wheels 38 outwardly along the additional racks 42 and into engagement with the spur racks 40. The movement of the toothed wheels 38 along the racks 40, 42 causes rotation of the toothed wheels 38 thereby rotating the elongate pivots 36. This rotation causes corresponding rotation of, initially, the outer arms 44. The upper arms 48 either do not rotate at all initially or rotate at a slower rate, depending upon the type of connection between the upper arms 48 and the elongate pivots 36. The bracing arms 46, being pivotally connected to the distal ends of the outer arms 44, are carried therewith during the rotation of the outer arms 44. A semi-extended position is illustrated in FIG. 3.

Figure 4:
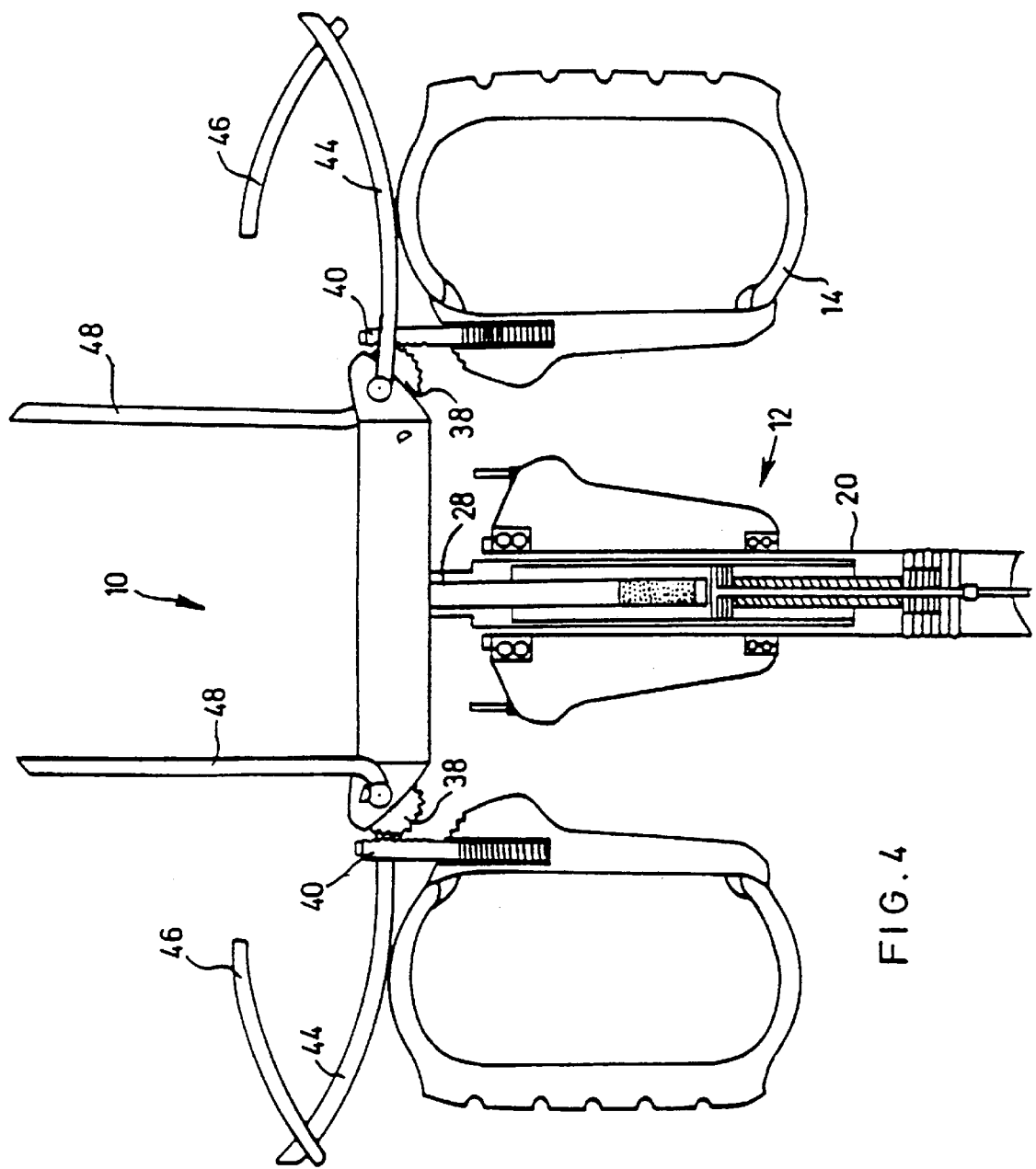
FIG. 4 is a view similar to FIGS. 2 and 3 but showing the apparatus in a fully-extended position.

FIG. 4 illustrates the fully extended position which is reached when the telescopic rod 28 reaches its maximum extension. In this position, the toothed wheels 38 have reached the upper extremities of the spur racks 40 and the outer arms 44 extend in a generally radial direction with respect to the wheel 12. The bracing arms 46 are configured and connected to the outer arms 44 in such a way that they extend generally circumferentially with respect to the wheel 12. Also, the upper arms 48 extend generally in the longitudinal direction of the axle 20.

In this fully extended position, the apparatus 10 is used to generate rotation of the wheel 12 and tire 14. This is achieved by the fact that sail members 54 are attached to the various arms 44, 46, 48. Alternative arrangements of sail members 54 are illustrated in FIGS. 5 and 6. Rotation of the apparatus 10 by virtue of the action of the air flow during flight causes rotation of the wheel 12 and tire 14. This rotation substantially reduces wear and tear on the tire 14 during landing.

The sail members 54 illustrated in FIG. 5 are flexible in nature in order to allow them to be folded when the apparatus is retracted. In the fully extended position, the sail members 54 essentially form a cup or scoop shape in order to catch the air flow and cause rotation in the required direction. The sail members 54 are fixedly connected to the outer arms 44, the bracing arms 46 and the upper arms 48. Furthermore, an inner sail portion 56 is anchored to the apparatus, preferably to the support member 30.

Each sail member 54 can include additional bracing members 58 in order to reduce any risk of the sail member 54 failing to unfold properly or assume the desired cup or scoop shape. Additionally, weighting means 60 can be incorporated into the sail member 54 at or or near the point furthermost from the outer arm 44. The weighting means can be formed integrally with the sail members 54 in the form of additional weights or other weighting means and is operated purely by the action of centrifugal forces as the apparatus 10 rotates.

FIG. 6 shows an alternative sail arrangement which incorporates a smaller sail area. In this arrangement, the sail members 54 are arranged at the radially outermost ends of the arrangement of arms. Connecting wires or cords 62 can be used to ensure adequate bracing and the previously described weighting means 60 are also included. The advantage of the arrangement illustrated in FIG. 6 is that the smaller sail members produce less drag during operation whilst still ensuring that the wheels and tires assume the desired rotational speed.

In order to return the apparatus 10 to the fully retracted position illustrated in FIG. 2, and this must clearly take place before the aircraft actually lands in order to avoid damage to the outer and bracing arms 44, 46 and sail members 54, the process described above must be reversed. The piston and cylinder arrangement 24 is again activated so as to bring the telescopic rod 28 into the retracted position. The retraction of the rod 28 causes the toothed wheels 38 to move down the spur racks 40 and the rotation of the toothed wheels 38 causes the arms 44, 46, 48 to rotate together with the elongate pivots 36 back into their retracted positions. As the toothed wheels 38 reach the lower ends of the spur racks 40, the support member 30 comes into contact with the release buttons 50 thereby allowing the U-shaped housings 34 to pivot with respect to the support member 30. Continued retraction of the rod 28 causes the toothed wheels 38 to transfer from the spur racks 40 onto the additional racks 42, thereby releasing the previous connection between the toothed wheels 38 and the spur racks 40. At this point, the arms 44, 46, 48 are all in their fully retracted positions and the sail members 54 are securely folded within the arrangement of arms 44, 46, 48. This retraction can easily take place immediately before landing without substantially reducing the acquired rotation of the wheel 12.

One further point requires to be addressed in connection with this embodiment and this is the accommodation of the spur racks 40 during the period when the undercarriage is raised for normal flight. Normally, the compartments within which the undercarriage is stowed during flight is precisely shaped to the requirements of the undercarriage and no additional space is allowed. If the present invention is to be utilized on aircraft already in existence, then provision must be made for the accommodation of the spur racks 40 which project beyond the normal outer plane of the wheel arrangement. Two alternative proposals are set out in FIGS. 7 and 8.

Figure 7:
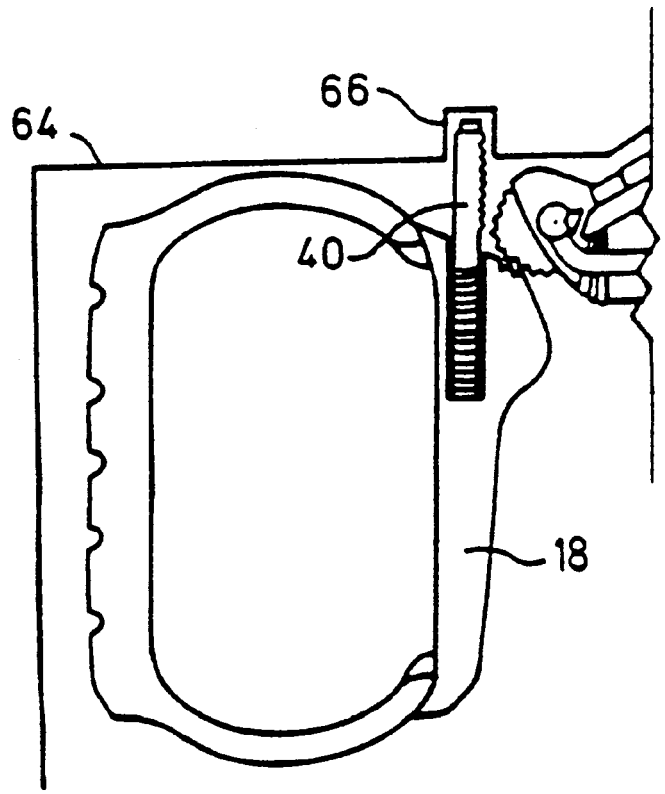
FIGS. 7 and 8 illustrate the apparatus of FIGS. 1 to 4 with alternative designs of sail attached.

If the spur rack 40 is to be rigidly fixed to the wheel rim 18 with no movement possible, then the undercarriage bay 64 must contain an appropriate recess 66 (FIG. 7). However, it must be borne in mind that, because the rotational position of the wheel 12 is infinitely variable after take-off, the recess 66 must take the form of an annular groove extending around the undercarriage bay. Of course, if the angular position of the wheel could be fixed after take-off, then a single blind bore for each spur rack 40 would be acceptable. However, additional apparatus to fixedly select the angular positioning of the wheel after take-off would then be required.

Figure 8:
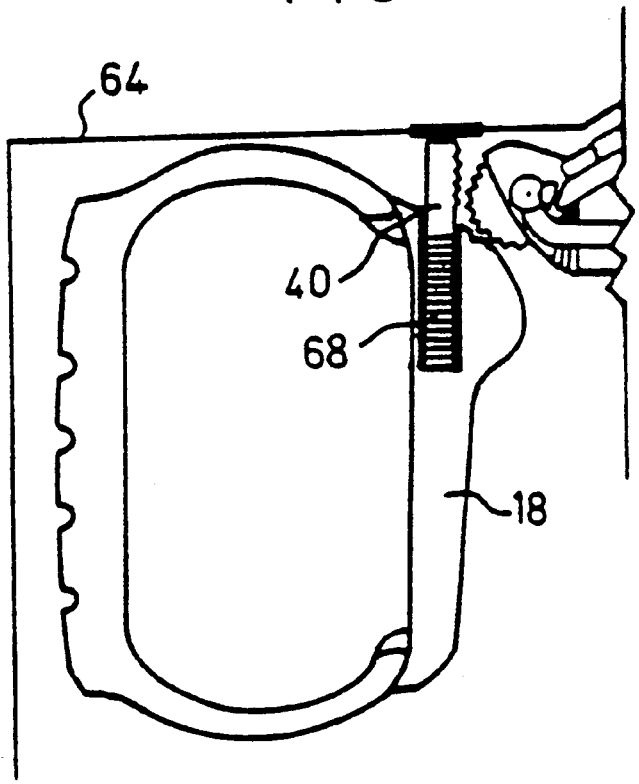

A further alternative version is illustrated in FIG. 8. In this arrangement, no recess is provided in the undercarriage bay 64 because the spur rack 40 is retractably mounted in the wheel rim 18. Biassing means 68, normally in the form of a compression spring, bias the spur rack 40 into the operational position illustrated in FIGS. 2, 3 and 4. Locking means (not shown) retain the spur rack 40 in this operational position. However, means for releasing these locking means can be provided, conveniently at the distal end of the spur rack 40. Thus, as the undercarriage is retracted into the undercarriage bay 64, the distal end of the spur rack 40 contacts a predetermined area of the undercarriage bay thus releasing the locking means. The spur rack 40 is then retracted into the wheel rim 18 against the action of the biassing means 68. As soon as the undercarriage is lowered, the spur rack 40 assumes its operational position as before.

Either of these arrangements would be suitable to accommodate a projecting spur rack in the undercarriage bay.

It will be appreciated that the apparatus described above will cause very little additional drag during take-off in view of the fact that it will be fully retracted. The apparatus will only come into effect as the aircraft makes its approach for landing. The apparatus would be extended during the landing approach and retracted immediately before final touchdown. This will give the aircraft wheels the maximum opportunity to attain a rotational speed appropriate to the landing speed of the aircraft. Regulating means can be provided if necessary to avoid the wheels attaining a rotational speed which is too high for the aircraft concerned. Alternatively, the area of the sail members can be varied in order to match the attainable wheel rotation speed to the aircraft in which the apparatus is deployed.

The apparatus can be formed from various high strength, low density materials such as those commonly in use in aircraft manufacture today. Furthermore, the apparatus can easily be fitted to existing aircraft with minimum disruption.

An embodiment of a second aspect of the invention is illustrated in FIGS. 9 to 14. In general, the Figures illustrate the apparatus 100 in combination with a wheel 102, consisting of a hub 104 and a rim 106 on which a pneumatic tire 108 is mounted, the wheel hub 104 being mounted in a conventional manner on an axle 110 by way of bearings 112.

The axle 110 incorporates a hollow chamber 114 in which a hollow support member 115 is telescopically movable. A hollow rod member 116 forming part of the axle 110 extends coaxially with the chamber 114 and support member 115 towards the apparatus 100. A valve for emitting compressed air or other hydraulic or pneumatic fluid is arranged in the distal end of the rod member 116. The valve is connected in any convenient manner to an existing pneumatic or hydraulic system already incorporated within the aircraft.

An upper housing 118 is rotatably mounted on the support member 115 above the wheel rim 106. The upper housing 118 is connected to the wheel 102 in that rotation of one about the axle 110 will cause rotation of the other. An upper reel 120 is also rotatably mounted with respect to the support member 115 and a braking member 122 is located on the side of the upper reel 120 remote from the upper housing 118. The braking member 122 is axially moveable with respect to the support member 115 but not rotatable with respect thereto.

The upper housing 118 contains an interior chamber 124 which is in communication with a compressed air source (not shown) via the valve in the rod member 116. At the outer circumference of the upper housing 118, a plurality of air vents 126 (see FIG. 12) are provided and a rotatably mounted fan arm 128 is associated with each air vent 126. The rotary mounting of each fan arm 128 is provided by means of a vertically extending axle 130 located adjacent the respective air vent 126 and about which the respective fan arm 128 is freely rotatable.

Located between the fan arms 128 and the wheel hub 104 is a freely rotatable lower reel 132. Also, tension cables 134 extend from the interior wall of the reel rim 106, to the upper reel 120, passing through the lower reel 132 and the distal ends of a plurality of the fan arms 128. The purpose of this arrangement will be described below.

Figure 9:
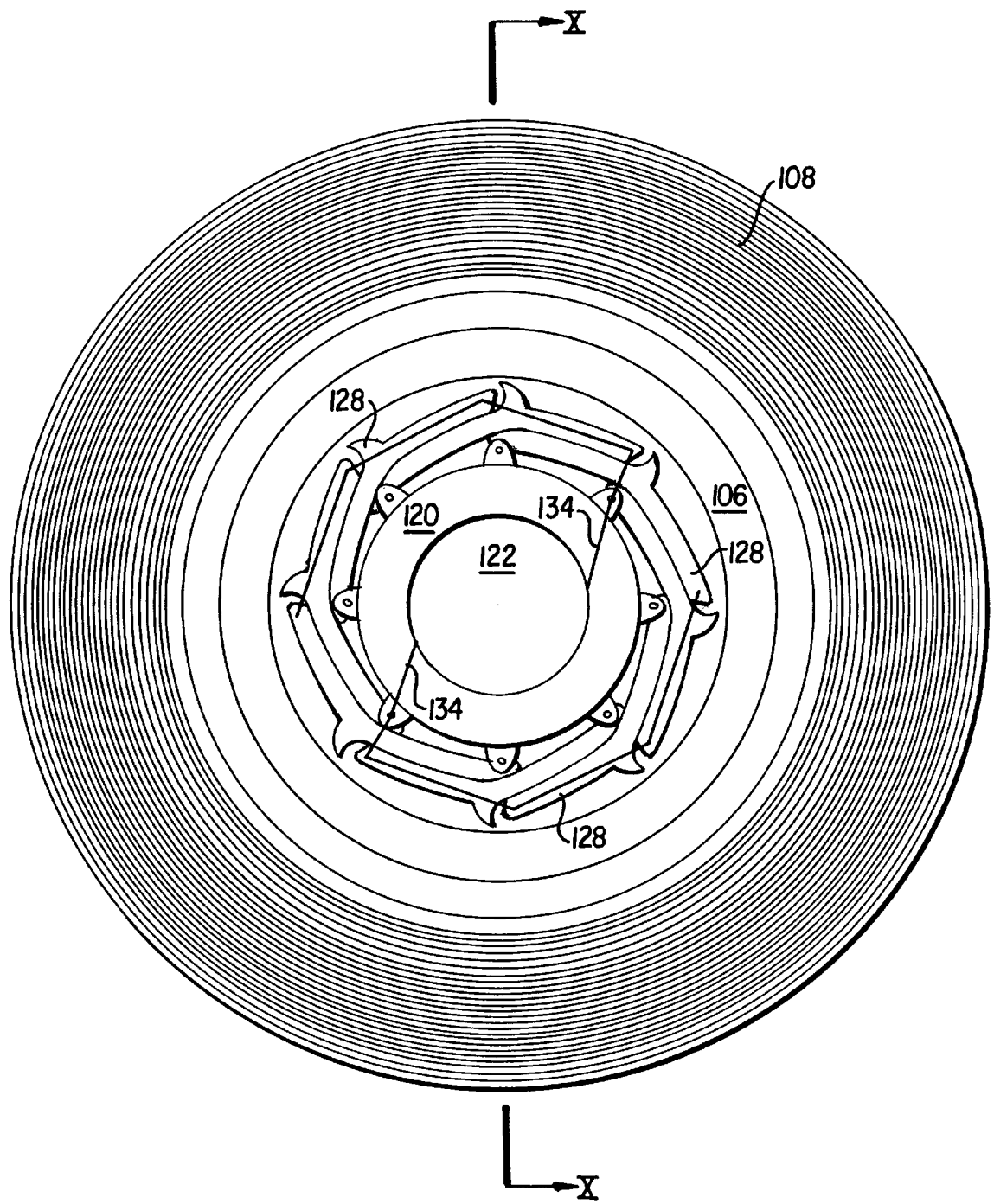
FIG. 9 illustrates an embodiment of a second aspect of the invention in a fully retracted position.

The fan arms 128 are generally angled or curved as shown in FIG. 9 so that, in the retracted position, they can overlap with one another and generally follow the shape of the upper housing 118. This minimizes any drag effect during take-off. Each fan arm 128 consists of a plurality of substantially planar fan members 136 lying generally tangentially to the upper housing 118. These fan members 136 are illustrated most clearly in FIG. 12. The fan arms 128 also incorporate sail members 140 which extend generally perpendicular to the longitudinal axis of the apparatus 100 in the fully extended position.

Figure 10:
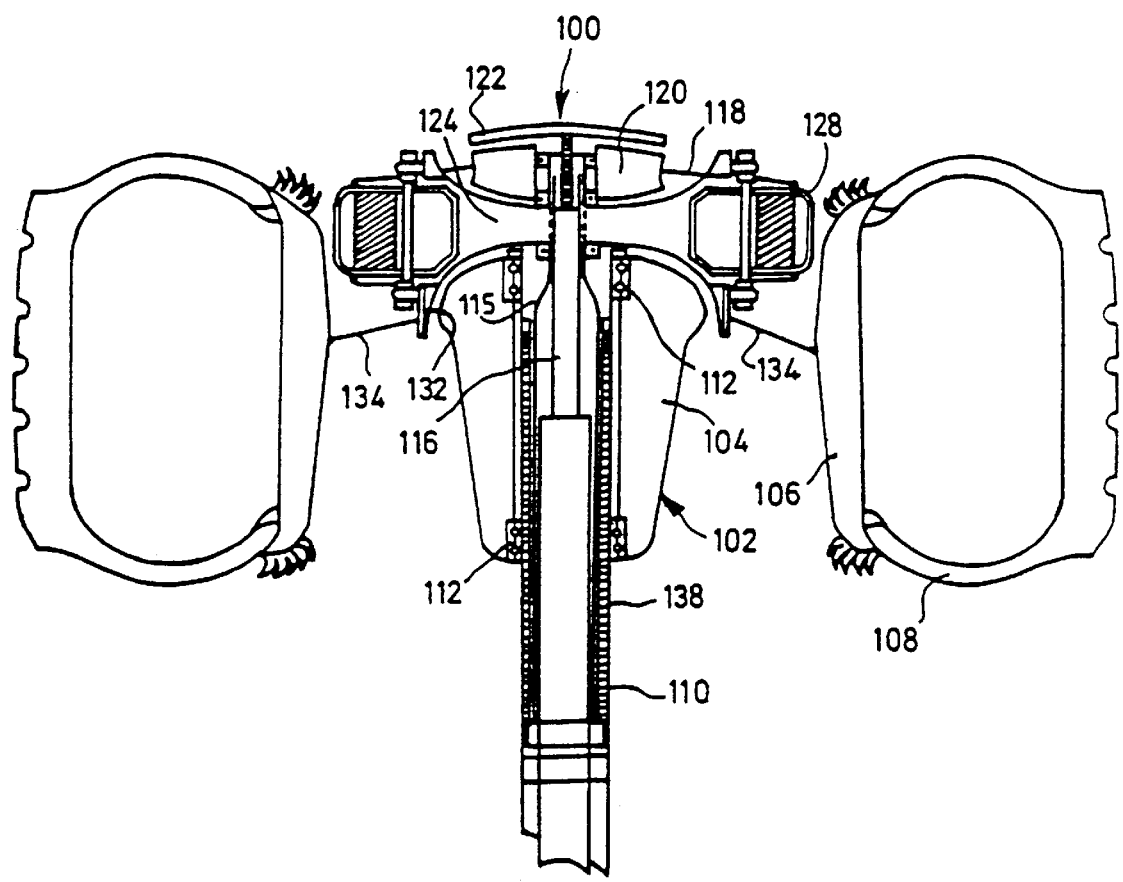
FIG. 10 is a cross-sectional view taken along the line X—X of FIG. 9.

FIGS. 9 and 10 illustrate the apparatus 100 in its fully retracted position. The support member 115 is fully retracted and the fan arms 128 are nested closely about the upper housing 118. The support member 115 is biassed into this retracted position by means of, for example, a compression spring 138 located inside the axle 110.

Figure 11:
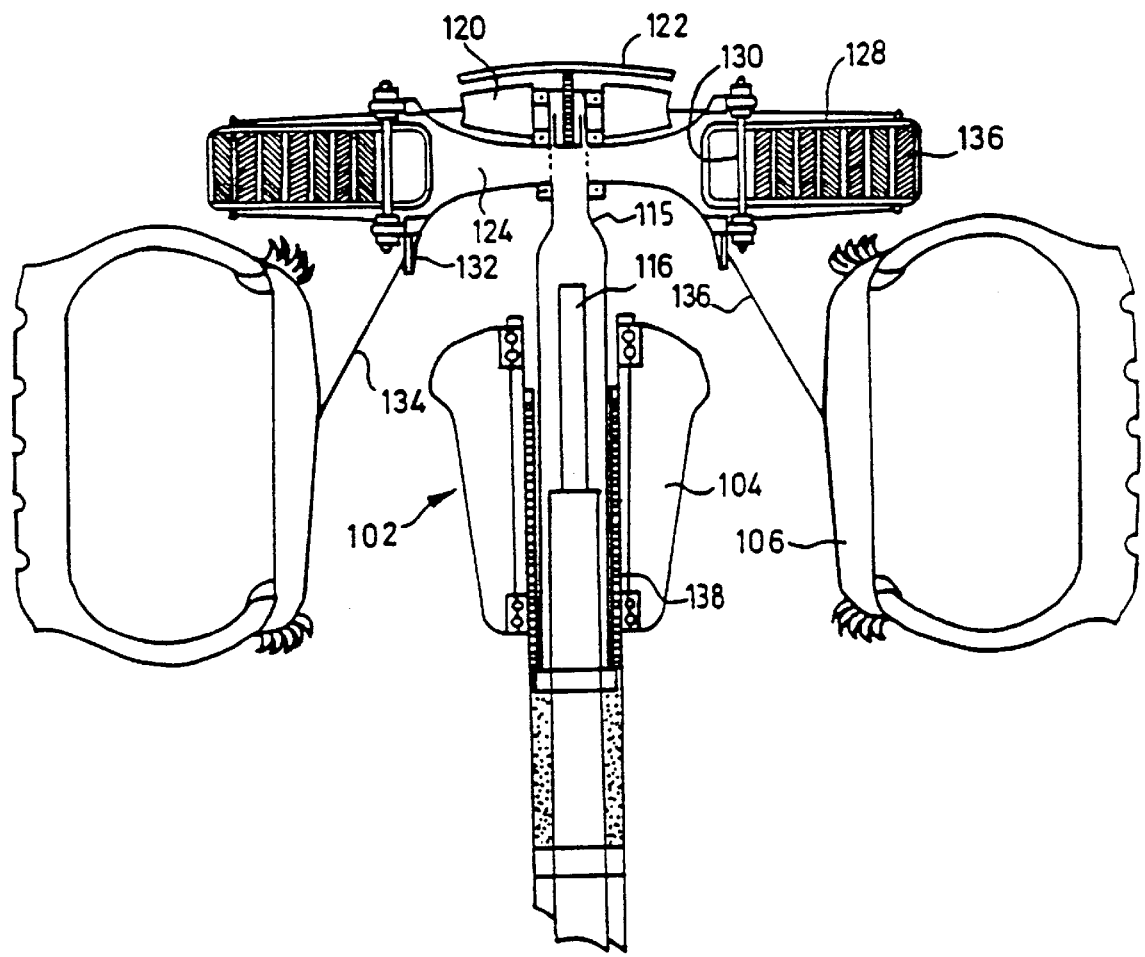
FIG. 11 is a view similar to FIG. 10 but showing the apparatus in a semi-extended position.
Figure 12:
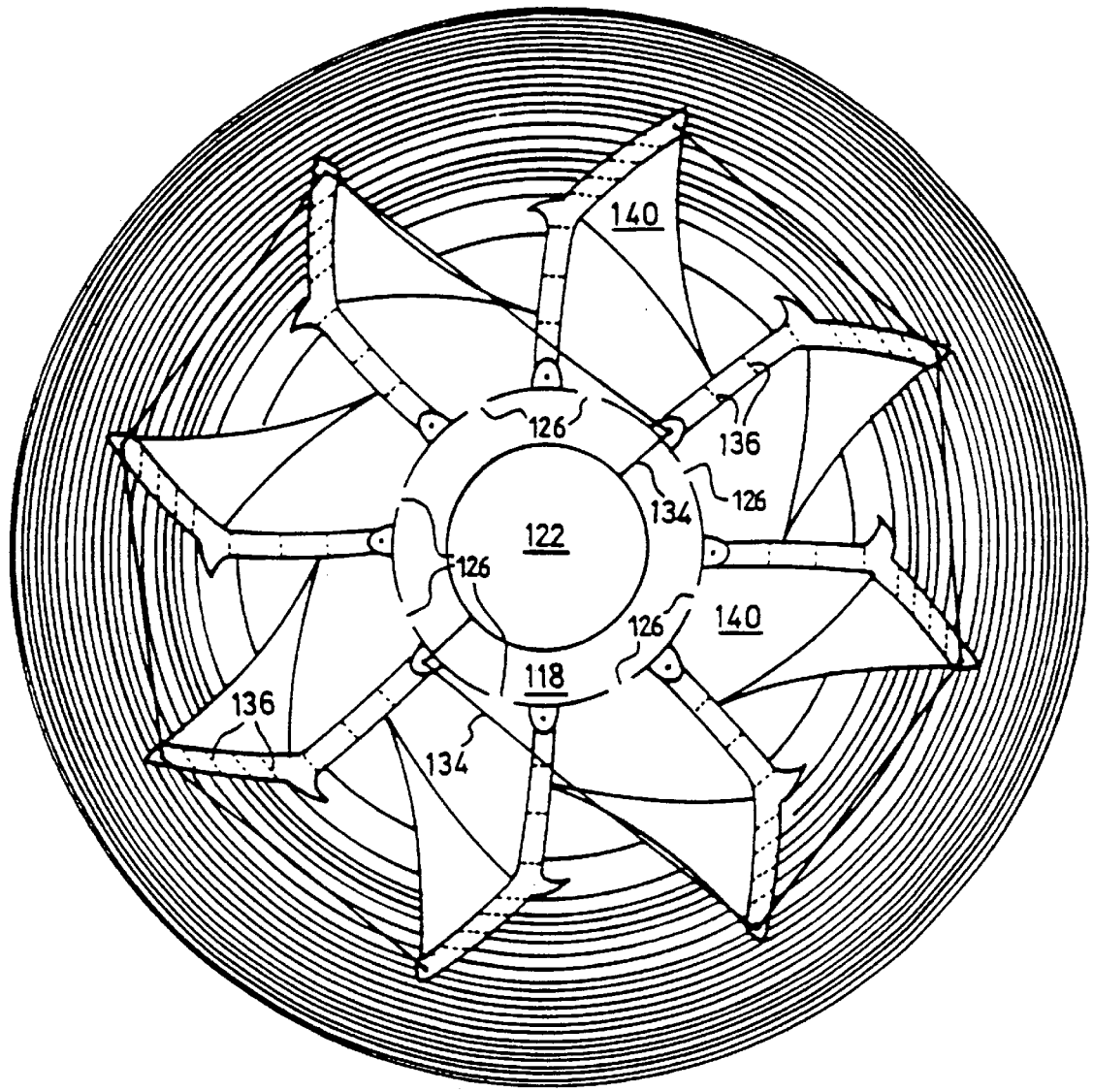
FIG. 12 is a view similar to FIG. 9 but showing the apparatus in a fully-extended position.
Figure 13:
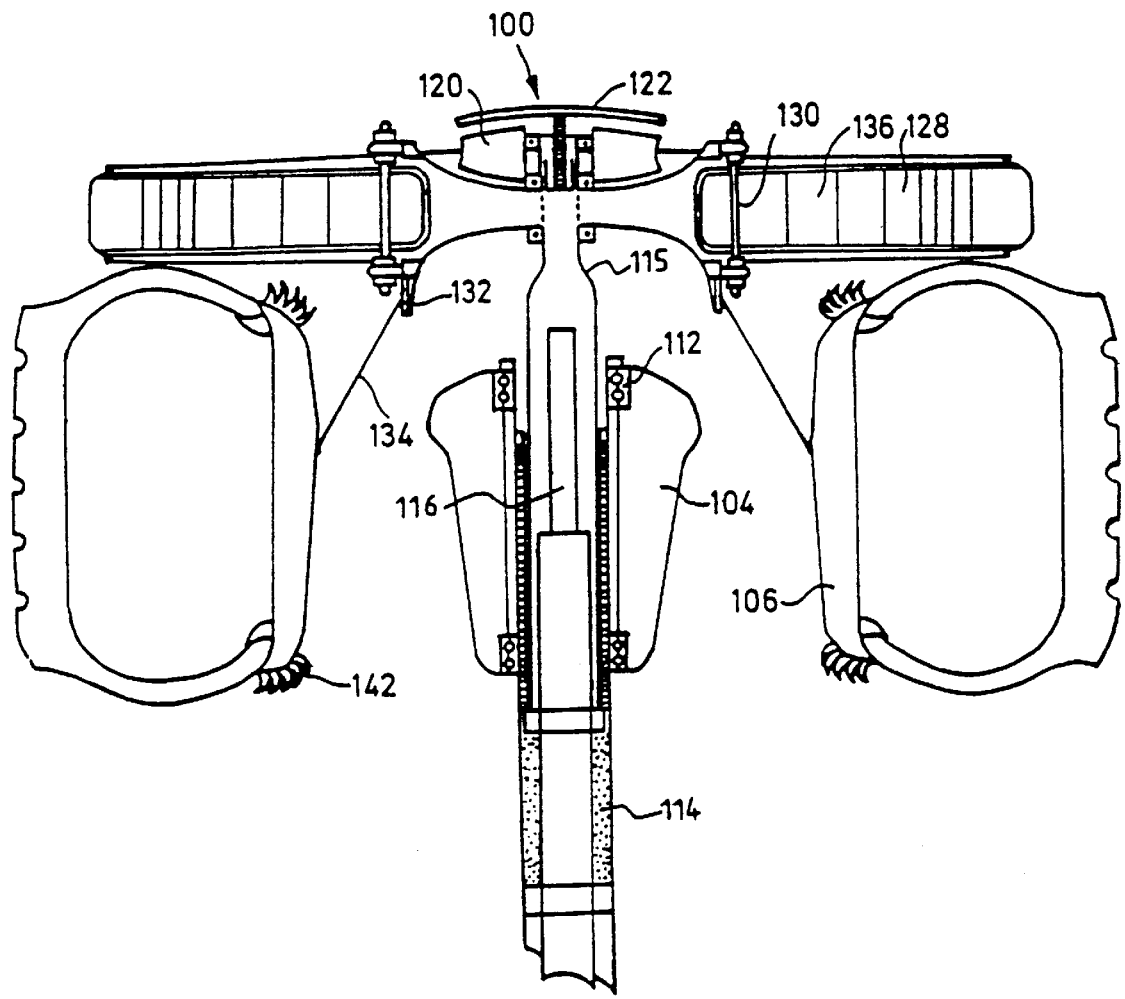
FIG. 13 is a view similar to FIGS. 10 and 11 but showing the apparatus in a fully-extended position.
Figure 14:
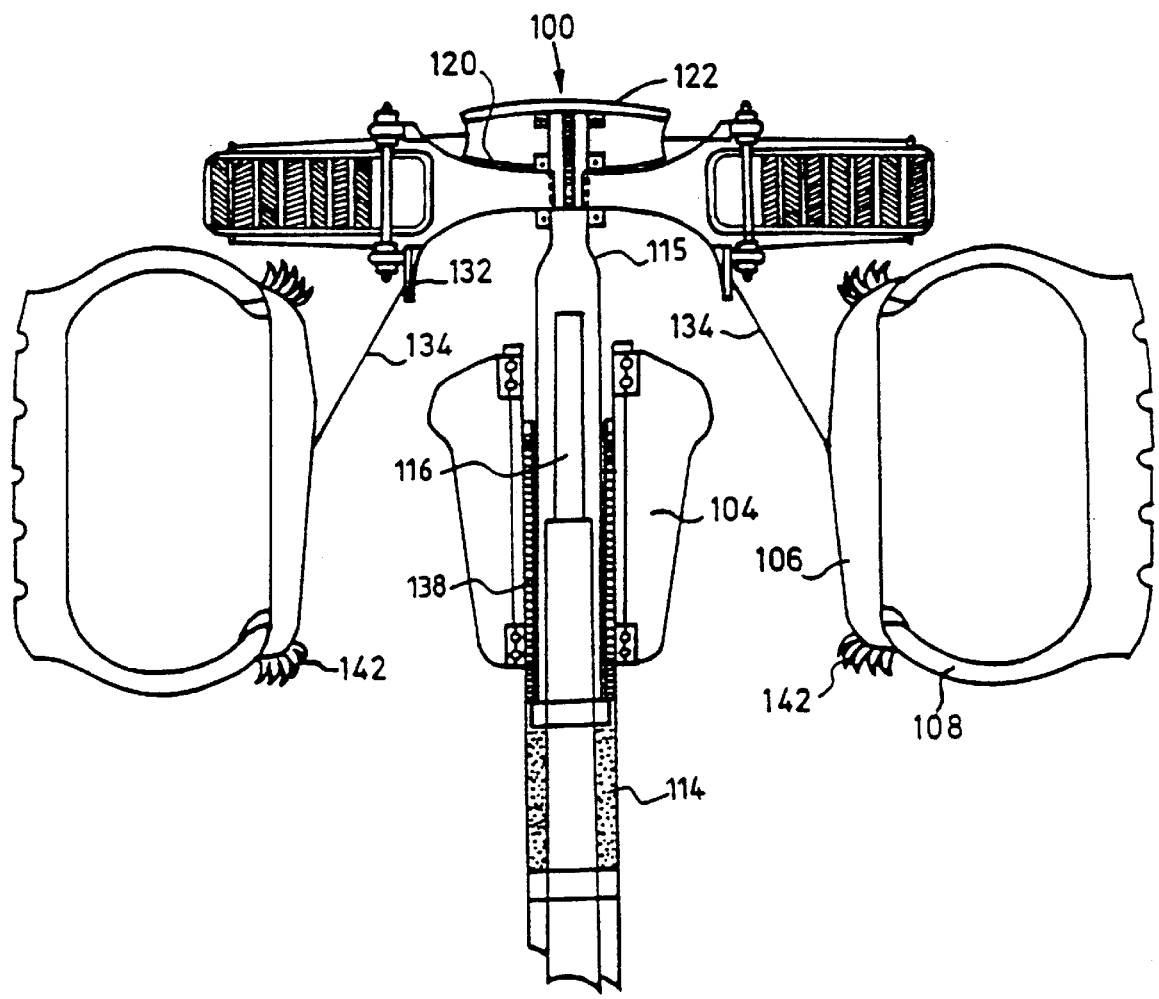
FIG. 14 is a view similar to FIGS. 10, 11 and 13 but showing the apparatus in a semi-retracted position.

When the apparatus is to be extended, compressed air is caused to flow through the valve in the distal end of the rod member 116. The pressure build-up in the chamber 124 causes the apparatus 100 to move longitudinally with respect to the axle 110 by telescopic sliding of the support member 115 in the hollow chamber 114. The apparatus 100 therefore extends together with the support member 115 away from the wheel hub 104. Simultaneously, the compressed air introduced into the interior chamber 124 of the upper housing 118 via the telescopic rod 116 is used to maintain the braking member 122 out of contact with the upper reel 120 as the apparatus moves into an extended position. A semi-extended position is illustrated in FIG. 11.

The compressed air entering the interior chamber 124 is allowed to exit via the air vents 126 which are arranged around the circumference of the interior chamber 124. The air vents 126 direct the compressed air onto the fan members 136 of the fan arms 128. This causes the fan arms 128 to rotate about the vertical axles 130 and move into the fully extended position illustrated in FIGS. 12 and 13. In this fully extended position, continued expulsion of compressed air through the air vents 126 causes the compressed air to impinge upon the fan members 136 and this in turn causes the fan arms 128 to rotate thus causing rotation of the upper housing 118 and thereby causing rotation of the wheel 102. The sail members 140 encourage the compressed airstream to impinge upon the fan members 136 without becoming diverted.

When it is desired to retract the apparatus 100 immediately prior to touch-down, the following steps are taken. Initially, the compressed air supply is cut off. A throttle valve (not shown) in the hollow chamber 114 ensures that the apparatus 100 retracts relatively slowly to allow time for the fan arms 128 to return to their retracted positions before the upper housing 118 returns to its own retracted position. However, the cutting off of the compressed air supply means that the braking member 122 is no longer maintained spaced apart from the upper reel 120. The braking member 122 therefore comes into frictional contact with the rotating upper reel 120 and slows the rotation thereof. The tension cables 134, which are fixedly connected to the circumference of the upper reel 120, are therefore effectively wound onto the upper reel. This places the tension cables 134 under increased tension and forces the fan arms 128, to whose distal ends the tension cables 134 are attached, to return to their retracted positions. The purpose of the lower reel 132 is to take up any slack in the tension cables 134 during the extension and retraction of the fan arms 128. Ideally, the lower reel 132 is kept under the action of biassing means so as to allow equilibrium to be maintained as far as possible without any slack being available.

As the fan arms 128 are moving between their extended and retracted positions, the apparatus 100 is also retracting in the axial direction of the wheel axle 110. The action of the throttle valve can be selected to ensure that the fan arms 128 do not come into contact with either the tire 108 or the wheel rim 106.

If desired, the wheel rim 106 or, indeed, the pneumatic tire 108 can incorporate relatively small wind catching members 142 which are designed to encourage the wheel 102 to rotate in a direction opposite to that required for landing. This feature is utilized during the extension of the apparatus 100 in order to allow the tension in the tension cables 134 to be relaxed as the fan arms 128 are moving from their retracted position to their extended position. Thereafter, the effect of the fan arms 128 will override any effect of the wind catching members 142.

Further embodiments similar to that described with reference to FIGS. 9 to 14 are shown in the remaining Figures. However, in the remaining embodiments, no extension of the apparatus is required. These embodiments are therefore relatively simple in that they do not incorporate any moving parts.

Essentially, in each embodiment, a compressed air chamber or passageway 150 is provided. Looking firstly at FIGS. 15 and 16, the chamber is bounded on one side by an upper cover 152 and by a lower passageway 154 on the other. At the radial extremes of the compressed air chamber 150, vents 156 are provided through which the compressed air introduced into the chamber 150 can escape. These vents 156 are arranged such that a tangential element of force is created, thereby ensuring that the wheel is rotated as compressed air passes through the vents 156. Arrangements different from that shown in FIG. 16 are, of course, possible and equally effective.

Figure 16:
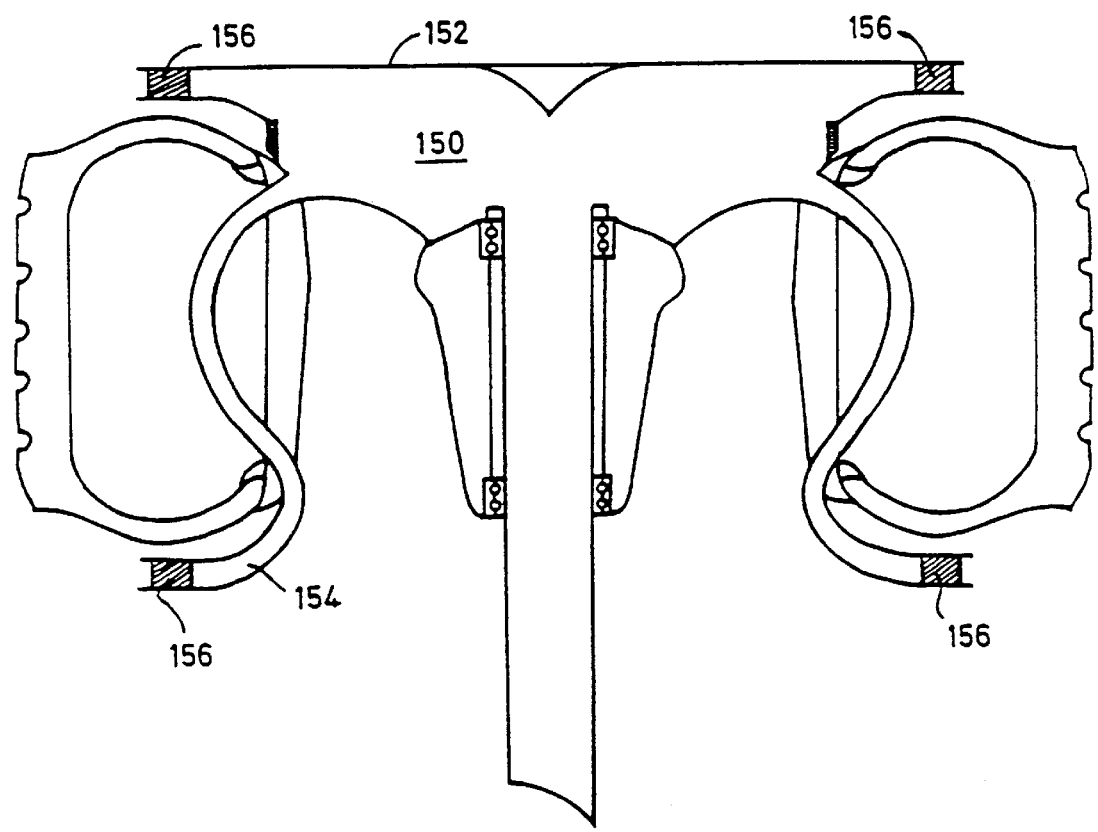
FIG. 16 is a cross-sectional view taken along line XIV—XIV of FIG. 15.

The lower passageways 154 illustrated in FIG. 16 are arranged to pass through the wheel rim into the pneumatic tire cavity before emerging again on the side of the tire remote from the cover 152. This is done to avoid interference with the braking system. It also reduces the risk of an imbalance of the wheel occurring.

Figure 15:
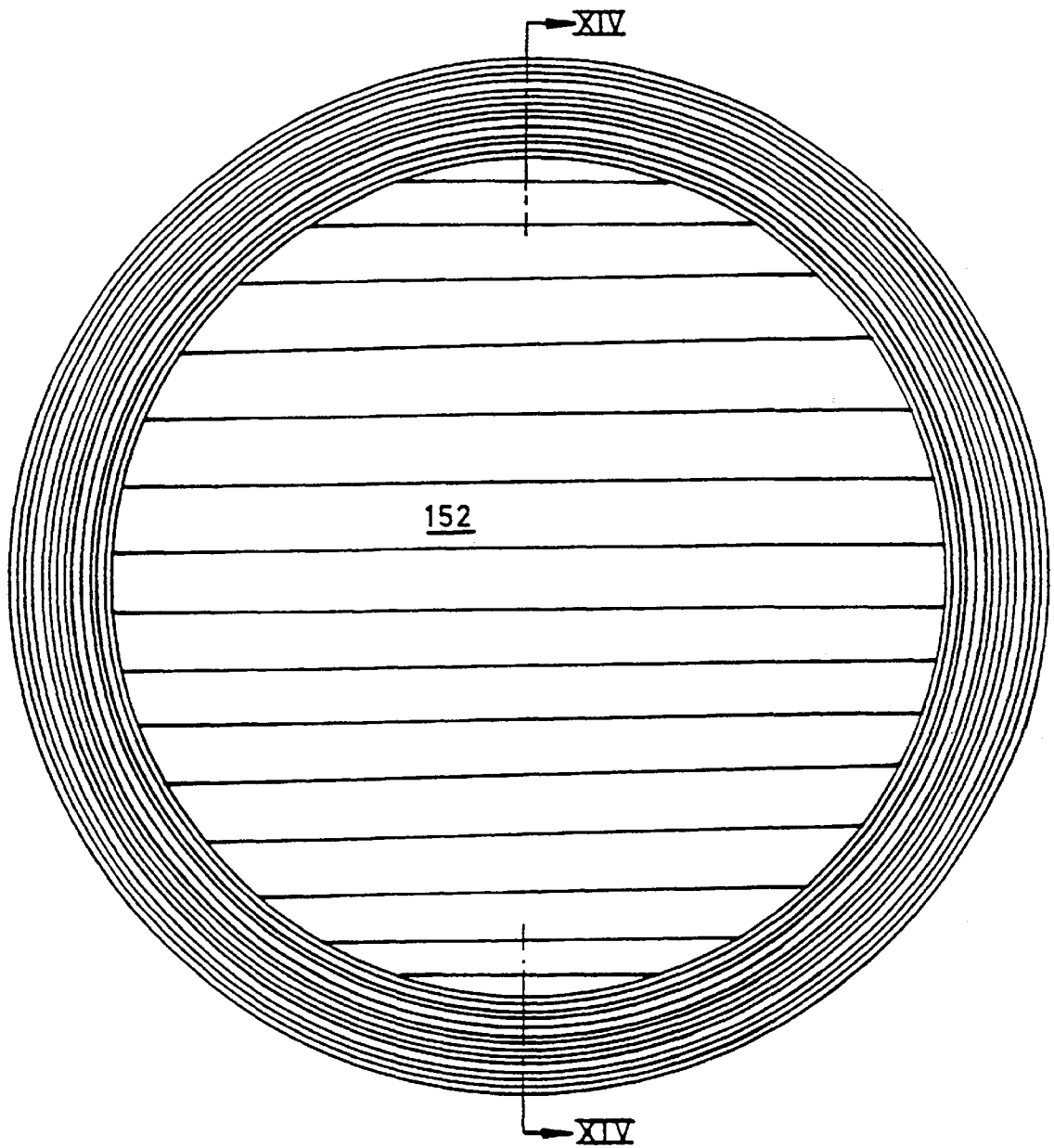
FIG. 15 is a plan view of a wheel incorporating apparatus according to a first embodiment of a third aspect of the invention.
Figure 17:
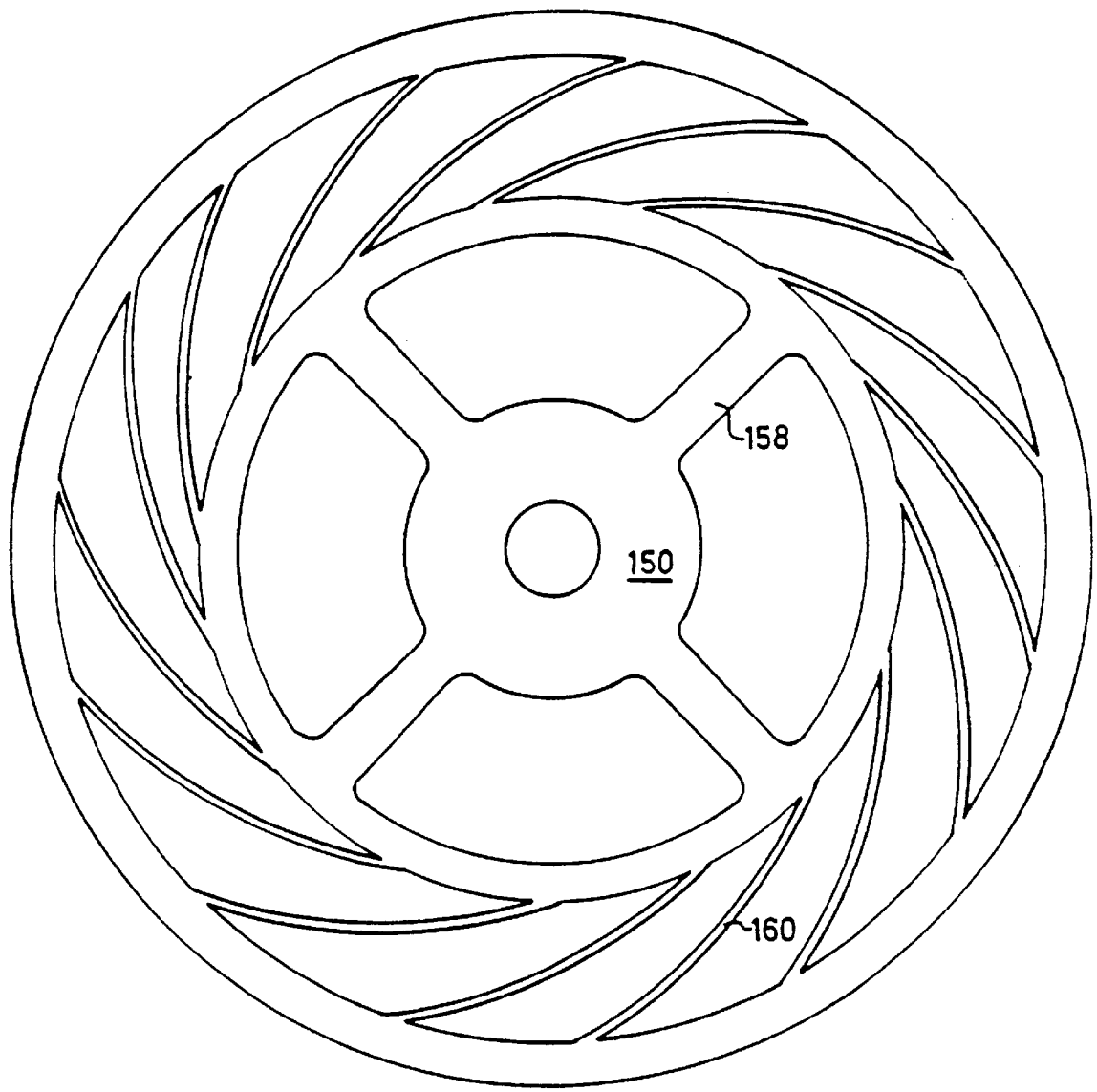
FIG. 17 is a plan view of a part of apparatus according to a second embodiment of the third aspect of the invention.
Figure 18:
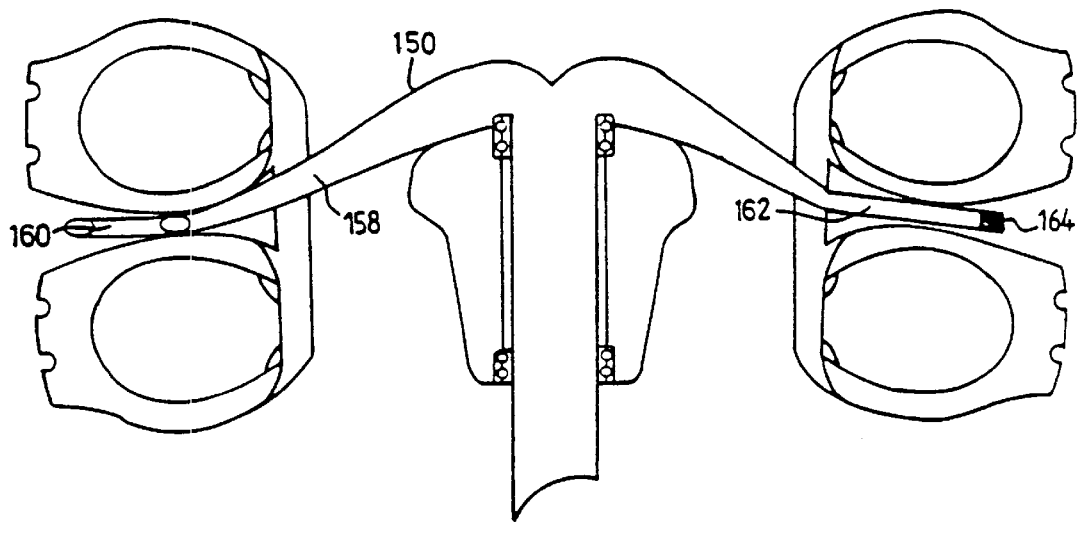
FIGS. 18 and 19 illustrate further embodiments of the third aspect of the invention.
Figure 19:
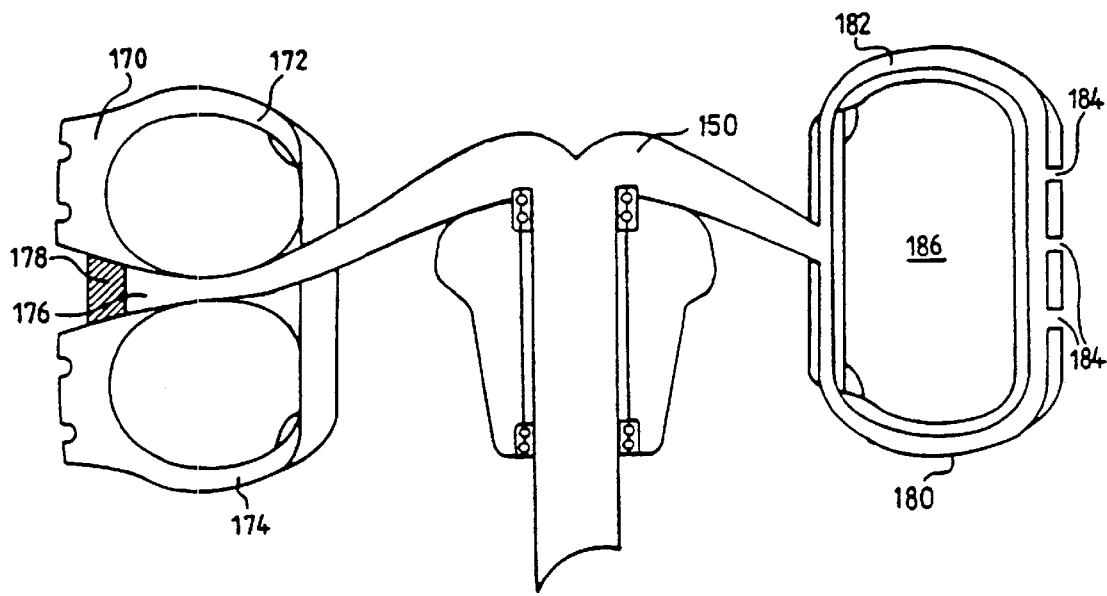

Turning now to the embodiments shown in FIGS. 17 to 19, it will be appreciated that FIGS. 18 and 19 each illustrate two various alternative arrangements. However, these embodiments are all based on the principle of the compressed air chamber 150 as illustrated in FIGS. 15 and 16. FIG. 17 is a plan view of the air chamber illustrated on the left hand side of FIG. 18. In this embodiment, compressed air is introduced to the chamber 150 via the axle. The compressed air passes along the radial passages 158 and then along the generally tangential passages 160 before exiting to atmosphere. The tangential arrangement of the passages 160 causes the wheel to which the chamber 150 is attached to rotate as compressed air is expelled.

It is particularly advantageous if the chamber 150 described above is used in conjunction with a wheel having two adjacent tires attached to a single wheel rim. The chamber 150 can be arranged so that the generally tangential passages 160 open in the area immediately between the two tires. This reduces the risk of the passages 160 becoming inadvertently blocked by foreign matter, although care must be taken to ensure that the passages 160 do not extend radially to such an extent that they may become damaged during landing.

A similar but alternative arrangement is illustrated on the right hand side of FIG. 18. The only difference between this arrangement and that described above is the fact that the passages 162 extend substantially radially with respect to the wheel rim and incorporate tangential vents 164 at their distal ends. Again, the vents are effectively shielded from damage by the dual tires and are positioned sufficiently near to the axle to avoid damage on landing.

FIG. 19 illustrates two further variations on the same theme. In the left hand side of FIG. 19, the radially outward area of the chamber 150 is essentially incorporated into the tire. The tire 170 is mounted on a single wheel rim but incorporates two separate tubes 172,174. The walls of the tubes 172,174 also form the walls of the radial passage 176 which is located between the tubes 172,174. A tangential vent 178 is arranged in the end of the passage 176. When compressed air introduced into the chamber 150 through the axle is allowed to escape through the vents 178, the wheel as a whole is caused to rotate.

As a final example, the outer wall of the tire can incorporate passages which will create the desired effect. In the right hand side of FIG. 19 a tire 180 is mounted on a wheel rim. The tire 180 has a passage 182 moulded into the outer wall thereof which is in communication with the chamber 150 via a connection in the wheel rim. In the radially outer wall of the tire 180, ie remote from the wheel rim, vents 184 are arranged which allow compressed air travelling down the passage 182 to escape to atmosphere. The vents 184 are arranged so as to produce a tangential element of flow in order to ensure that the passage of air therethrough creates a rotational movement of the wheel. The passage 182 is kept completely separate from the tire proper; ie. there is a substantial dividing wall between the tire cavity 186 and the passage 182. The vents 184 can also be protected by means of shields (not shown) to prevent damage thereto on landing.

It will be appreciated that all of the arrangements illustrated in FIGS. 18 and 19 are automatically balanced provided that the radially-extending passages are equiangularly spaced. It will also be appreciated that none of the embodiments illustrated in FIGS. 15 to 19 contain moving parts and therefore the cost of maintaining and repairing such parts is eliminated.

I claim:

1. Apparatus for causing an aircraft wheel to rotate in an airflow, comprising a plurality of wind-catching members disposed about a central axis, wherein driving means are provided for drivably moving the wind-catching members between a nonoperative, retracted position and an operative, extended position in which the wind-catching members project radially beyond the outer radial periphery of the aircraft wheel.

2. Apparatus as claimed in claim 1, wherein, in the extended position, the wind-catching members project at least as far from the central axis as the outer radial periphery of a tire attached to the aircraft wheel.

3. Apparatus as claimed in claim 1, wherein, in the retracted position, the wind-catching members do not project beyond the outer periphery of the aircraft wheel.

4. Apparatus as claimed in claim 1, wherein, during movement between the retracted and extended positions, the wind-catching members are displaced both radially and axially with respect to the central axis.

5. Apparatus as claimed in claim 4, wherein the wind-catching members are mounted on a central mounting portion which is displaced axially during movement between the retracted and extended positions.

6. Apparatus as claimed in claim 5, wherein, on movement from the retracted position to the extended position, the wind-catching members move radially subsequent to the axial movement of the central mounting portion.

7. Apparatus as claimed in claim 5, wherein, on movement from the retracted position to the extended position, the wind-catching members move radially simultaneously with the axial movement of the central mounting portion.

8. Apparatus as claimed in claim 1, wherein the driving means comprises an hydraulic or pneumatic arrangement housed or housable within a hub or axle of the aircraft wheel.

9. Apparatus as claimed in claim 8, wherein the hydraulic or pneumatic arrangement is connected or connectable to a supply of hydraulic or pneumatic fluid in the aircraft and normally used for purposes other than the movement of the wind-catching members.

10. Apparatus as claimed in claim 1, wherein the wind-catching members comprise articulated arm members and flexible sail members.

11. Apparatus as claimed in claim 10, wherein the sail members incorporate reinforcement means.

12. Apparatus as claimed in claim 11, wherein the reinforcement means comprise struts disposed in or on the flexible sail members.

13. Apparatus as claimed in claim 10, wherein the sail members comprise weighting means located substantially centrally of the flexible sail members.

14. Apparatus as claimed in claim 13, wherein the weighting means are located in pockets in the flexible sail members.

15. Apparatus as claimed in claim 10, wherein, in the retracted position, the arm and sail members are folded so as to minimize drag.

16. Apparatus as claimed in claim 10, wherein, in the extended position, the arm and sail members present a relatively large area to the passing airflow such that rotation of the aircraft wheel is induced.

17. Apparatus as claimed in claim 10, wherein the wind-catching members are equispaced about the central axis, wheel hub or axle.

18. Apparatus as claimed in claim 17, wherein two wind-catching members are provided.

19. An aircraft wheel incorporating the apparatus of claim 1.

20. An aircraft having at least one wheel as claimed in claim 19.

21. Apparatus for causing an aircraft wheel to rotate, comprising at least one nozzle or vent located on the circumference of a circle centered on the axle of the aircraft wheel and arranged to expel air at least partially circumferentially with respect to the said circle, and air supply means for providing air to the at least one nozzle or vent for expulsion therethrough, the air supply means comprising a compressed air source and an air supply passage connecting the compressed air source to the at least one nozzle or vent, the at least one nozzle or vent being rotatable with the aircraft wheel such that expulsion of the air through the at least one nozzle or vent causes rotation of the aircraft wheel, wherein, when the at least one nozzle or vent is in use, the at least one nozzle or vent is located radially beyond the outer radial periphery of the aircraft wheel.

22. Apparatus as claimed in claim 21, wherein the air supply passage passes through the axle of the wheel.

23. Apparatus as claimed in claim 22, wherein a portion of the air supply passage is formed by a chamber located within a hub of the wheel.

24. Apparatus as claimed in claim 22, wherein a portion of the air supply passage is located inside a tire attached to a rim of the wheel.

25. Apparatus as claimed in claim 24, wherein the portion of the air supply passage located inside the tire is formed integrally with the said tire.

26. Apparatus as claimed in claim 24, wherein at least some of the nozzles or vents are located on the tire.

27. Apparatus as claimed in claim 21, wherein at least some of the nozzles or vents are located on the wheel or an attachment therefor.

28. Apparatus as claimed in claim 21, wherein a plurality of nozzles or vents are equispaced about the circumference.

29. Apparatus as claimed in claim 21, wherein the at least one nozzle or vent is arranged to expel air substantially tangentially with respect to the said circle.

* * * * *